3,310,522
CROSS-LINKING PROCESS OF POLYVINYL CHLORIDE
Sakae Takahashi, Kanagawa-ku, Yokohama, Hiroshi Nishimura, Kohoku-ku, Yokohama, and Mitsuo Inui, Nishi-ku, Yokohama, Japan, assignors to The Furukawa Electric Company Limited, Tokyo, Japan, a corporation of Japan
No Drawing. Filed July 16, 1962, Ser. No. 210,180
Claims priority, application Japan, July 19, 1961, 36/25,979
3 Claims. (Cl. 260—41)

The present invention relates to a cross-linking process for the polymer or copolymers of vinyl chloride, and, more particularly, it is characterized in that 10 to 40 parts by weight of a metal oxide and 0.5 to 5.0 parts by weight of vulcanizing accelerator are mixed in 100 parts by weight of the resin in the mixture which resin consists mainly of polymer or copolymers of vinyl chloride, and the mixture is heated.

Since polymer or copolymers of vinyl chloride are thermoplastic resins they inevitably soften at a temperature above about 140° C. and develop deformation, and, being linear polymers, they easily dissolve in an organic solvent.

As the method for obviating such defects, it has been known that irradiation is applied to polymer or copolymers of vinyl chloride to effect cross-linking, but the irradiation needs a special apparatus which is very inconvenient for handling, so that its practical use is difficult, and, accordingly, there is no known process adapted for commercial purposes.

In carrying out the invention a mixture which contains (1) 100 parts by weight of polyvinyl chloride or copolymer of vinyl chloride-vinyl alkyl ether, or of vinyl chloride-vinyl esters of aliphatic acid, e.g., vinyl chloride-vinyl acetate or vinyl chloride-vinyl stearate; (2) a requisite quantity of plasticizer, such as dioctyl phthalate; (3) a requisite quantity of a stabilizer, such as basic lead carbonate; (4) at least 5 parts by weight, preferably 10 to 40 parts by weight of metal oxide or metal oxides, such as zinc, lead, magnesium, antimony, calcium, iron, cadmium and barium and (5) 0.5 to 5.0 parts by weight of a member of a class consisting of 2-mercapto-imidazoline, 2-mercapto-thiazoline or di-orthotolyl guanidine salt of dicatechol borate is heated to a temperature of above 130° C. to cause cross-linking between molecules of polymer or copolymers of vinyl chloride, thereby causing the said resin to be converted into a three dimensional structure with increased heat resistance, reduced deformation, insolubility in organic solvent, and improved mechanical properties.

The heating time has intimate relation with the heating temperature and as the temperature is raised higher the heating time can be shortened.

The plasticizers and stabilizers contained in the above mixture include those which are usually applicable to polyvinyl chloride resin or copolymerized resin thereof.

It is yet impossible exactly to explain the mechanism of cross-linking in accordance with the invention, but it may be considered that by heating a mixture of polymer or copolymers of vinyl chloride and metal oxide there occurs dehydrochlorination of molecules of polymer or copolymers of vinyl chloride in said mixture, thereby resulting in cross-linking between molecules.

The reason why the mixture ratio of the metal oxide is defined at 5 or more parts by weight is that below 5 parts by weight the cross-linking effect is weak.

Any of the above metal oxides may be used alone or in combination of 2 or more without objection.

The reason why the vulcanizing accelerator such as 2-mercapto-imidazoline is added according to the invention is to accelerate the cross-linking effect of polymer or copolymers of vinyl chloride as shown in Table I.

Further, according to the invention, fillers such as carbon black, calcium carbonate, clay, talc, silica and diatomaceous earth may be added without objection, and by adding a substantially large quantity the cost of the resinous mixture of polymer or copolymers of vinyl chloride can be lowered. When a large quantity of the above filler is added to the conventional polyvinyl chloride resinous mixture, the resulting mixture becomes brittle and causes a condition which is not suitable for use. On the contrary, in accordance with the invention, as much as 100 or more parts by weight of the filler to 100 parts by weight of the resin in the mixture of polymer or copolymers of vinyl chloride may be added without becoming brittle.

The invention will be explained with examples, wherein part means weight part.

*Example 1*

Basic composition: Parts
Polyvinyl chloride resin (trade name Geon 101 EP) _____ 100
Dioctyl phthalate _____ 60
Basic lead carbonate _____ 10
Calcium carbonate _____ 10

To the above basic composition were added 12 parts of zinc oxide, 6 parts of antimony oxide and 3.6 parts of 2-mercapto-imidazoline, and the mixture was heated at 160° C. for 30 minutes to effect cross-linking.

*Examples 2 and 3*

To a mixture of said basic composition shown in Example 1 were added 18 parts and 27 parts respectively of zinc oxide, and 3.6 parts of 2-mercapto-imidazoline, and heated at 160° C. for 30 minutes.

*Example 4*

To said basic composition were added 27.0 parts of magnesium oxide and 3.6 parts of 2-mercapto-imidazoline, and heated at 160° C. for 30 minutes.

*Example 5*

To said basic composition were added 27.0 parts of antimony oxide and 3.6 parts of 2-mercapto-imidazoline, and heated at 160° C. for 30 minutes.

The test results of mechanical properties and solvent resistance of the cross-linked polyvinyl chloride resin mixtures obtained by the Examples 1 to 6 are shown in Table 1. For the purpose of testing whether the polyvinyl chloride resin mixture of the invention had been cross-linked the same test was conducted on said basic composition alone.

TABLE 1

|  | Conventional product | Example (1) | Example (2) | Example (3) | Example (4) | Example (5) |
|---|---|---|---|---|---|---|
| Tensile strength, kg./mm.$^2$ | 1.70 | 2.26 | 2.10 | 2.14 | 2.11 | 2.24 |
| Elongation (percent) | 300 | 350 | 360 | 350 | 290 | 360 |
| Swelling (percent) | Dissolved | 280 | 510 | 410 | 290 | 250 |

NOTE: Swelling ratio is a ratio of weight measured before and after dipping into methyl ethyl ketone at 70° C. for 5 hours.

Furthermore, heat deformation percent (deformation after a load of 4 kg./cm.$^2$ is continuously applied for 30 minutes at the measuring temperature shown in Table 2) and recovery percent (recovery 10 minutes after the load is removed after the measurement of deformation) of the cross-linked product under Example 1 and also of conventional product are shown in Table 2.

TABLE 4

|  | Example (8) | Conventional compound |
|---|---|---|
| Tensile strength (kg./mm.$^2$) | 2.32 | 1.96 |
| Elongation (percent) | 180 | 150 |
| Swelling ratio (percent) | 230 | Dissolved |

TABLE 2

| Measuring temperature, ° C. | Conventional compound | | Example (1) | |
|---|---|---|---|---|
|  | Deformation, percent | Recovery, percent | Deformation, percent | Recovery, percent |
| 80 | 14.6 | 98.4 | 12.9 | 99.5 |
| 100 | 24.8 | 95.1 | 14.7 | 98.0 |
| 120 | 33.6 | 95.1 | 23.4 | 97.8 |
| 150 | 78.6 | 32.2 | 34.9 | 92.0 |

*Example 6*

| | Parts |
|---|---|
| Copolymer of vinyl chloride-vinyl isobutyl ether | 100 |
| Dioctylphthalate | 40 |
| Tribasic lead sulphate | 7 |
| Basic lead sulphite | 5 |

To the above basic composition were added 13 parts of antimony oxide, 10 parts of zinc oxide and 3 parts of 2-mercapto-imidazoline, and the mixture was heated 160° C. for 30 minutes for vulcanization. The results of measuring the mechanical properties and solvent resistance are shown in Table 3.

The similar test was effected of a conventional mixture of the above basic composition only.

TABLE 3

|  | Example (7) | Conventional compound |
|---|---|---|
| Tensile strength (kg./mm.$^2$) | 2.42 | 1.80 |
| Elongation (percent) | 290 | 240 |
| Swelling ratio (percent) | 430 | Dissolved |

*Example 7*

| | Parts |
|---|---|
| Polyvinyl chloride resin | 100 |
| Dioctyl phthalate | 50 |
| Tribasic lead sulphate | 7 |

To the above basic composition were added 10 parts of antimony oxide, 20 parts of zinc oxide, 4 parts of 2-mercapto-imidazoline, and 50 parts of thermal black, and the mixture was heated at 160° C. for 30 minutes to effect vulcanization.

The same test was effected of the conventional mixture of the above basic composition only.

As apparent from the above table, the mechanical properties and solvent resistance of polymer or copolymers of vinyl chloride can be considerably improved by simple process according to the invention without special apparatus and it shows that these resins had been cross-linked apparently and had excellent effect.

What we claim is:

1. In a process for cross-linking polyvinyl chloride the improvement which comprises adding to a polymer selected from the group consisting of homopolymer and copolymers of vinyl chloride, a mixture consisting essentially of between about 10 to 40 parts by weight of at least one metal oxide selected from the group consisting of zinc, lead, antimony, calcium, iron, cadmium, barium and magnesium oxides and 0.5 to 5.0 parts by weight of 2-mercapto-imidazoline, both based on 100 parts by weight of said member, and vulcanizing said mixture at a temperature above 130° C. for at least approximately 30 minutes in order to complete the vulcanization.

2. A process according to claim 1, further comprising adding to the mixture before vulcanization about 5 to 150 parts by weight of a filler selected from the group consisting of carbon black, calcium carbonate, clay, talc, silica and diatomaceous earth.

3. A process according to claim 1, wherein said mixture contains a vinyl chloride copolymer selected from the group consisting of vinyl chloride-vinyl alkyl ether and vinyl chloride-vinyl aliphatic ester copolymer.

References Cited by the Examiner

UNITED STATES PATENTS

| 2,157,997 | 5/1939 | Brous | 260—92.8 |
| 2,274,616 | 2/1942 | Raynolds | 260—86 |

(Other references on following page)

UNITED STATES PATENTS

| | | |
|---|---|---|
| 2,419,166 | 4/1947 | Rogers et al. _____ 260—42 |
| 3,017,379 | 1/1962 | Feild. |
| 3,183,207 | 5/1965 | Nimoy et al. _____ 260—41 |

OTHER REFERENCES

Alliger, G., et al.: Vulcanization of Elastomers, 1964, New York, Reinhold Publishing Co. (chapters 7-8 relied on), pp. 254-57; 280-81.

Forman, D. B., et al.: "Vulcanization of Neoprene Type W," Ind. & Eng. Chem. 42, 686-91 (1950), p. 691.

MORRIS LIEBMAN, *Primary Examiner.*

K. B. CLARKE, A. HOLTZ, J. FROME,

*Assistant Examiners.*